United States Patent
Mori et al.

(10) Patent No.: US 7,187,374 B2
(45) Date of Patent: Mar. 6, 2007

(54) PORTABLE TERMINAL DEVICE

(75) Inventors: Naoki Mori, Yokohama (JP); Koji Suzuki, Yokohama (JP); Susumu Kojima, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 553 days.

(21) Appl. No.: 10/670,769

(22) Filed: Sep. 26, 2003

(65) Prior Publication Data
US 2004/0104910 A1   Jun. 3, 2004

(30) Foreign Application Priority Data
Sep. 30, 2002   (JP) .............................. 2002-284734

(51) Int. Cl.
G09G 5/00   (2006.01)
(52) U.S. Cl. ...................... 345/211; 345/102; 345/204; 455/566
(58) Field of Classification Search ........ 345/211–213, 345/102, 204; 455/38.3, 566
See application file for complete search history.

(56) References Cited
U.S. PATENT DOCUMENTS 5,894,298 A * 4/1999 Hoeksma .................... 345/102
6,029,049 A * 2/2000 Kawashima ................ 340/7.37
6,278,887 B1 * 8/2001 Son et al. ................... 455/566
2001/0022584 A1 * 9/2001 Tsugawa ..................... 345/211
2003/0020699 A1 * 1/2003 Nakatani et al. ............ 345/204

FOREIGN PATENT DOCUMENTS

JP   10-304031        11/1998
JP   P2000-253141 A   9/2000

* cited by examiner

Primary Examiner—Richard Hjerpe
Assistant Examiner—Kimnhung Nguyen
(74) Attorney, Agent, or Firm—McDermott Will & Emery LLP (57) ABSTRACT

A portable terminal device suppresses increase in power consumption of a plurality of CPU while keeping favorable usability for the user of the device. The device includes a communication CPU to execute communication processing, an application CPU to execute application processing, a display to display an image according to a signal outputted from the communication CPU and/or application CPU, and a power supply to increase/decrease supply of power to the application CPU according to a periodical update interval of an image displayed on the display.

7 Claims, 11 Drawing Sheets

PORTABLE TERMINAL DEVICE

BACKGROUND OF THE INVENTION

The present invention relates to a portable terminal device and, in particular, to processing to control states of a plurality of central processing units (CPU).

In a portable telephone device of the prior art, the device is controlled to reduce power consumed by the device such that a display screen thereof is turned off each time a predetermined period of time lapses and the display screen is turned on when an incoming call arrives or a particular button thereof is depressed. Reference is made to, for example, JP-A-2000-253141. In portable communication equipment, even after a display section thereof is turned off to reduce power consumption, the display section is turned on at an interval of a predetermined period of time for the user to determine whether or not the equipment is in operation. Reference is made to, for example, JP-A-10-304031.

SUMMARY OF THE INVENTION

Recently, with increase of functions of portable terminal devices such as portable telephone devices, it is required in each of the devices to dispose a CPU for application in addition to a CPU for communication. When a plurality of CPU are disposed as above, power consumption of the device increases as compared with the device including one CPU. Therefore, it is necessary to much more reduce power consumption in addition to reduction of power consumption through the operation of turning the display screen off.

On the other hand, when functions are turned off to reduce the power consumption, there arises a problem of deterioration of usability of the device for the user.

It is therefore an object of the present invention, which has been devised to overcome this difficulty, to provide a portable terminal device in which power consumption is be reduced while keeping usability of the device for the user.

The object can be solved by the invention described in the claims of the present specification.

According to the present invention, it is possible to provide a portable terminal device capable of reducing unnecessary supply of power to constituent components.

Other objects, features and advantages of the invention will become apparent from the following description of the embodiments of the invention taken in conjunction with the accompanying drawings.

DESCRIPTION OF THE EMBODIMENTS

Referring now to the drawings, description will be given of an embodiment according to the present invention.

Figure 12A:
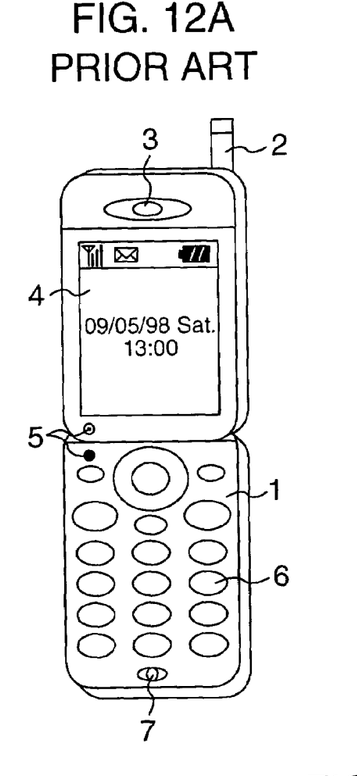
FIGS. 12A and 12B are diagrams showing appearances of a configuration of a folding portable terminal device of the prior art.
Figure 12B:
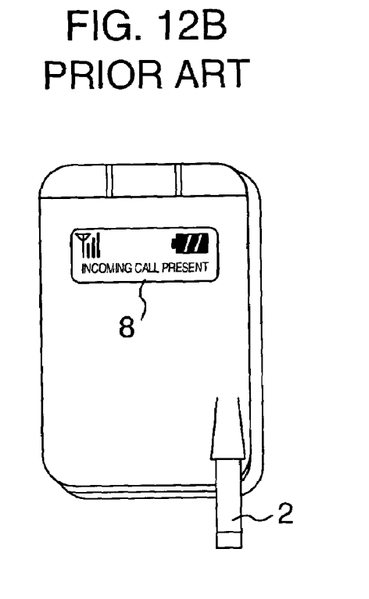

FIGS. 12A and 12B show appearances of a general portable terminal device of folding type. FIG. 12A is a state in which the device is opened, and FIG. 12B shows a state in which the device is closed. The portable terminal device 1 includes two sections, i.e., an upper section and a lower section. The two sections are coupled to each other by, for example, a hinging mechanism to form a folding configuration. In a first section of the device, an antenna 2, a receiver section 3, a main display screen 4, and the like are arranged. The screen 4 is a main screen to display various information items for the user. In general, the user can confirm the information items when the terminal device is opened. On the screen, there are displayed, for example, a state of receiving radio waves, presence or absence of reception of mail, information such as remaining battery power, and information of "day and time".

On the other hand, in another section of the portable terminal device 1, an operator's key section 6, a transmitting microphone 7, and the like are arranged. The user uses the key section 6 to input characters and numerals. The terminal device also includes an open/close detector unit 5 to detect a state in which the device is opened and a state in which the device is closed. According to an event that the terminal device is opened or closed, a switch is, for example, turned on/off.

FIG. 12B shows a subordinate display screen 8. This is a display section disposed on an outer side of the display device when the device is closed. In the closed state of the device, the user can confirm information items such as a state of an incoming call, a state of receiving radio waves, presence or absence of reception of mail, and remaining battery power.

The folding portable terminal device is usually folded when the device is not used. Ordinarily, a radio telephone section conducts an intermittent receiving operation in the closed state and a transmitting function and the main display screen are turned off. When the terminal device is opened and is kept in the opened state for a predetermined period of time, power for the intermittent operation and power to constituent components not requiring power are interrupted and/or a clock speed of a clock signal supplied to a CPU (main control microprocessor) is reduced to thereby lower power consumption.

Figure 13:
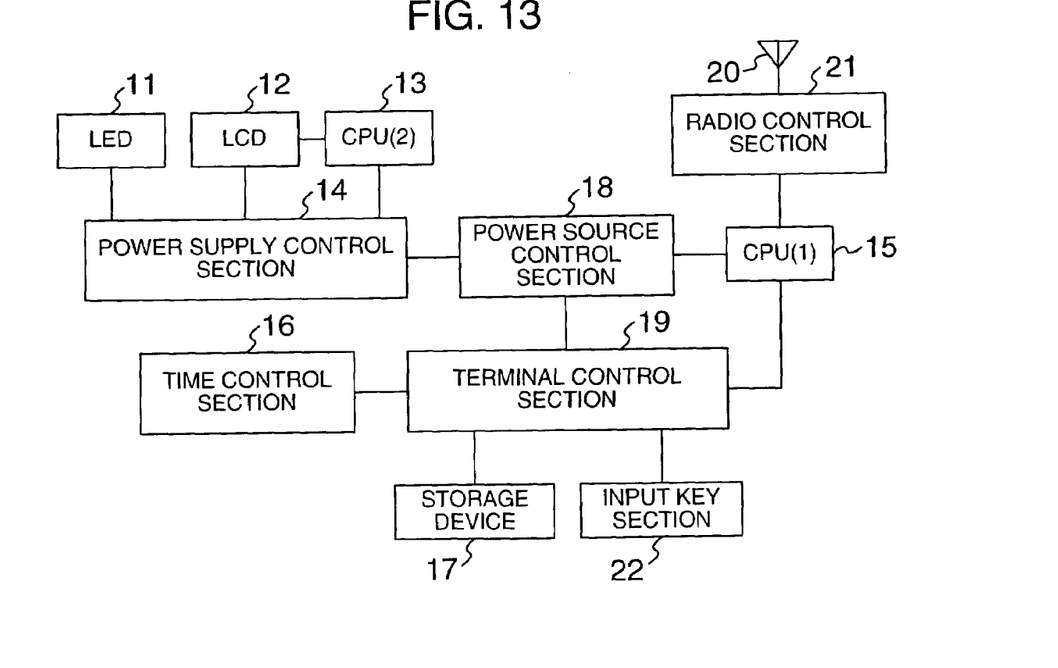
FIG. 13 is a block diagram showing a configuration of an embodiment of a portable terminal device according to the present invention.

FIG. 13 shows an example of a configuration of an embodiment of a portable terminal device according to the present invention. In the example, the portable terminal device has a processing function. The function is partly the same as that of the portable terminal device of the prior art, and remaining part thereof is added to the embodiment according to the present invention. Each processing function is mainly implemented by executing a control processing program (software) according to the present invention. The program is processed by a CPU (1) 15 and a CPU (2) 13 as control microprocessors. The control processing programs and various data items are primarily stored in a storage device 17. One aspect of the configuration example resides in that the portable terminal devices includes a plurality of CPU. FIG. 13 includes two CPU, i.e., the CPU (1) 15 and the CPU (2) 13.

In the portable telephone device 1, call issuance and reception control for a telephone line is conducted by a telephone antenna 20 and a radio control section 21. The control section 21 controls transmission and reception of basic signals such as signals of conversation, and the antenna 20 transmits and receives radio waves to and from a base station. In this configuration, according to a terminal control section 19 and a power control section 18 to control the overall operation of the portable terminal device, the CPU (1) controls a state of the radio control section 21 and supply of power thereto.

A power supply control section 14 is a section to execute processing as one aspect of the present invention. The control section 14 is a section to comprehensively manage/control supply of power to and states of primarily the CPU (2) 13, a liquid-crystal display (LCD) 12, and light emitting diode (LED) 11. The control section 14 and the CPU (1) 15 are comprehensively controlled by the power control section 18 according to a state of the terminal device.

In the configuration example, the CPU (2) conducts display control of the LCD, and hence the LED is additionally disposed for backlight of the LCD. The LED is used also to control backlight for input keys and to manage a charged state.

The power control section 18 and the terminal control section 19 are used to control the system of the portable terminal device. In the operation, the terminal control section 19 obtains information items such as the current time from a time control section 16 and executes count processing of a delay timer. According to necessity, the control section 19 saves information in the storage device 17 and/or acquires information from the storage device 17. The control section 19 can receive input information from the operator using the input key device 22.

Figure 1:
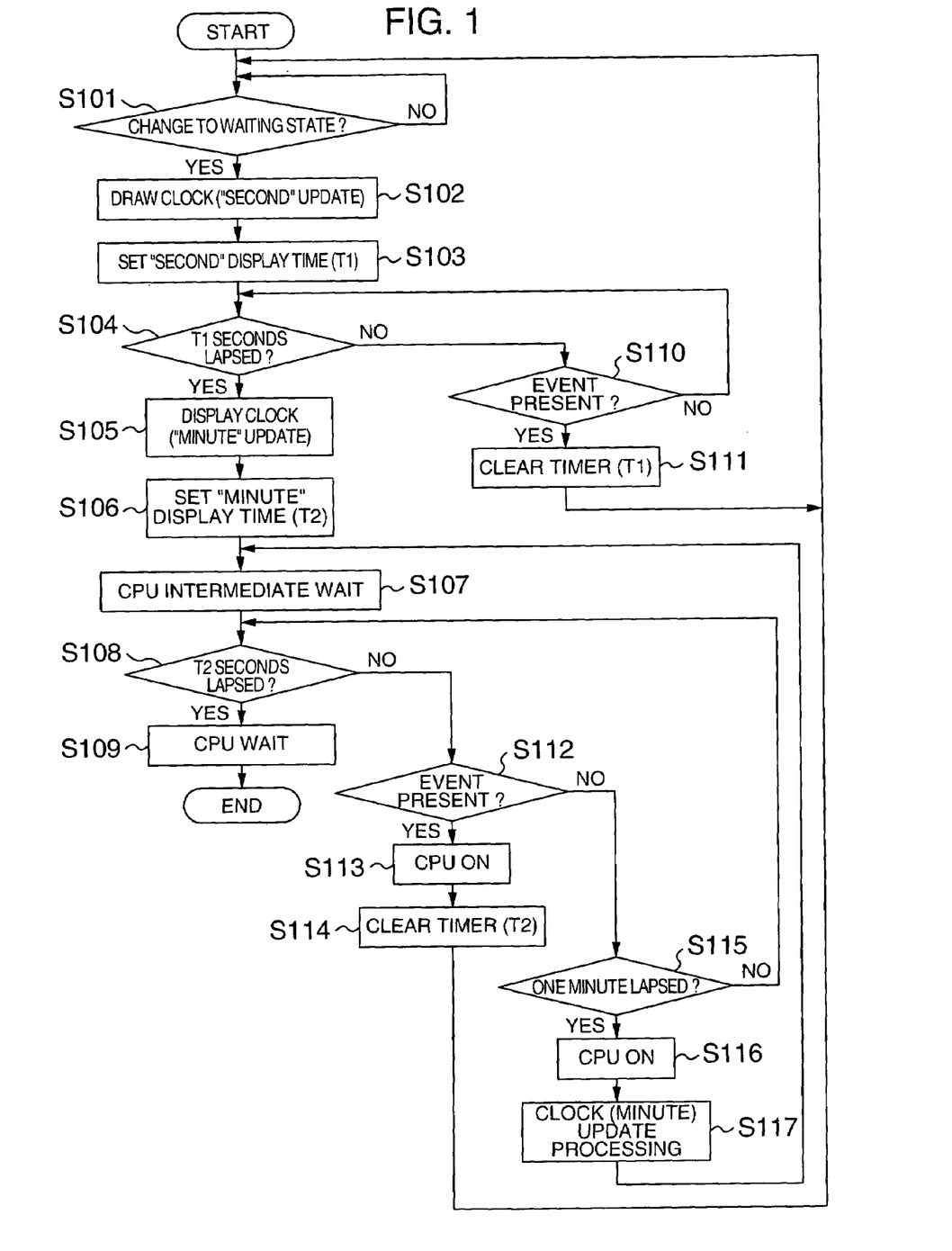
FIG. 1 is a flowchart showing a processing procedure of operation to execute CPU control according to the contents of a display screen in an embodiment of portable terminal device according to the present invention.

FIG. 1 shows a basic processing procedure of operation to control a state of a CPU according to the contents of processing in an embodiment of a portable terminal device according to the present invention. Description will first be given of the overall processing flow by referring to FIG. 1. Next, processing of CPU2 and CPU1 will be described by referring to FIGS. 2 and 3.

Description will now be simply given of states of the CPU, namely, "execution (on)", "intermediate wait", "wait", and "off" used in the embodiment. Generally these states are as follows.

When the portable terminal device is executing processing, for example, in response to an operation of a user or in an operation to receive a call from an external device, the CPU is ordinarily in a state "in execution".

On the other hand, the wait state is a state to wait for a call, a key input from a key, or an external switch operation. The wait state can be changed to the state "in execution" at occurrence of one of the wait events. For example, in the embodiment of the portable terminal device of FIG. 1, when the terminal device is kept in a waiting state for a predetermined period of time, that is, when the user does not conduct any operation and there occurs no event for the predetermined period of time, the state is changed to the wait state.

Like the wait state, the intermediate wait state is a state waiting for an event. However, the intermediate wait state indicates a state between the state "in execution" and the wait state. For example, by keeping power supplied to some devices, a return period to return to the in-execution state is reduced as compared with a return period from the wait state to the in-execution state. Or, it is possible to store a state at a preceding point of time. However, since some devices are being powered, consumption current is larger than that in the wait state.

The state "CPU off" indicates a state in which when power of the portable telephone terminal device is, for example, turned off, the device does not respond to events such as reception of an incoming call and a input from a key. However, an operation to turn power of the terminal device on can be accepted by the terminal device.

The state of the CPU is not restricted by those described above.

Step S101 is processing to detect an event that the user stops the use of the terminal device and the state is changed to the waiting state. A waiting screen is a general name of the screen displayed when the user does not conduct any operation such as an input operation in the terminal device. In this situation, the terminal device is in a processing wait state for an input from a user or for reception of an incoming call. Ordinarily, the state is changed to the waiting state by depressing a "call end (power off)" key for a short period of time. Although description will now be given by reference to the waiting screen, the display screen is not restricted by the waiting screen.

When the user depresses the "call end (power off)" key, the terminal control unit 19 detects the input from the key section 22 to change the state of the portable terminal device to the waiting state. In step S102, "time" is displayed on the main display screen 4. Description will now be given by assuming that the time of step S102 is displayed on the main display screen. The screen displays "hours (hr), minutes (min), seconds (sec)" ("second" display clock) ordinarily, the display on the main display screen is conducted when the folding portable telephone terminal device is kept opened or in a straight portable telephone terminal device. When the folding terminal device is closed, it is not necessary to display the time on the main screen, and it is also possible to quickly change the state of the CPU to the intermediate wait state or the wait state.

Figure 7A:
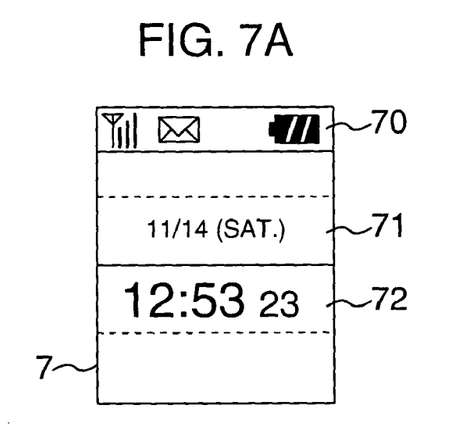
FIGS. 7A to 7C are diagrams respectively showing layouts of a display screen in an embodiment of a portable terminal device according to the present invention.
Figure 7B:
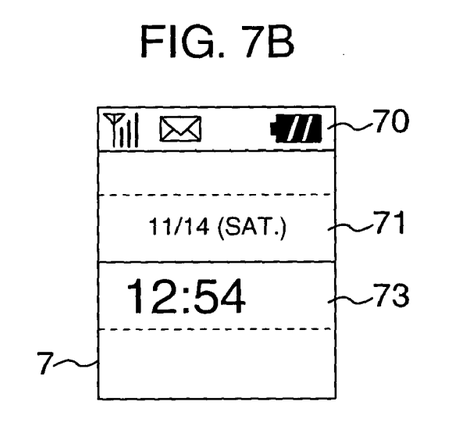
Figure 7C:
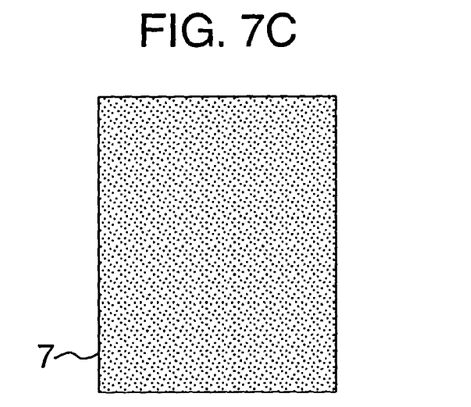

FIGS. 7A to 7C show examples of the display screen layout. FIG. 7A is a screen displaying "hour, minutes, seconds" and corresponds to the screen displayed in step S102. A display area 70 is a picto-area to display information such as intensity of a received electric field, presence or absence of reception of mail, and a remaining voltage of a battery. These information items are updated in a non-periodic way, for example, when the intensity of a received electric field is changed. A display area 71 indicates "date (day of the week)" and a display area 72 displays time, namely, "hr, min, sec". Step S103 is processing to set a point of time t1 at which the clock of FIG. 7A is displayed in the screen. The time t1 set in this step may be in various formats. For example, the time t1 is a fixed value beforehand registered to the system or the user of the terminal device beforehand selects and sets a particular point of time as the time t1. Step S104 is processing to determine a lapse of time relative to when the clock is displayed. When an event occurs during update of the clock, namely, before a lapse of t1 seconds, the system executes processing to leave the waiting state. In this case, control transfers from step S110 to step S111 to execute processing to clear a timer t1 Control then transfers to execution of processing for the event. In this situation, although the event means an action such as an input of a key from the user or reception of an incoming call, description of the processing associated with each event will be avoided.

On the other hand, when such an event does not occur, the screen of the clock is displayed for t1 seconds and then control goes from step S104 to step S105 to execute processing to change the screen display to the clock display. FIG. 7B shows an example of the clock display. The point of time is indicated by hours and minutes in a display area 73, and seconds are not displayed.

Step S106 is processing to set a display time t2 of the clock. Moreover, step S107 is processing to change the state of the CPU controlling the screen display to the intermediate wait state. While the clock is being displayed, the intermediate wait state is basically kept unchanged.

The clock displayed in step S105 is a clock screen to display hours and minutes. Seconds are not displayed. Therefore, the time being displayed is updated at an interval of one minute. Steps S115 to S117 are processing to update the time at the one-minute interval. When a lapse of one minute is detected in step S115, control goes to step S116 to execute "on processing" to return the CPU to the in-execution state. Step S117 is processing to update the minute display of the clock. After the time is updated, control returns from step S117 to step S107 to set the CPU again to the intermediate wait state. As above, the minute display of the clock is updated during t2 seconds at a one-minute interval. The CPU conducting the clock display repeats the operation in which the CPU returns from the intermediate wait state to the in-execution state at an internal of one minute to update the time (minutes). Thereafter, the CPU changes its state again to the intermediate wait state.

Although not shown in FIG. 1, it is necessary to update the display of the intensity of the received electric field in the display area 70 shown in FIGS. 7A and 7B, for example, when the intensity of the received electric field is changed. In this case, when the CPU is in the intermediate wait state, the CPU executes processing similar to that of steps S115 to S117 to update the displayed information. The update is conducted with other than a periodical frequency. However, in a place where the electric field is not stable, the information must be often updated in some cases. That is, the screen must be updated at an interval of time less than one minute depending on cases.

In step S112, when an event occurs before a lapse of the display time, i.e., t2 seconds of the minute display clock, control goes to step S113. In step S113, the CPU executes "on processing" to return the CPU from the intermediate wait state to the in-execution state. In step S114, the CPU clears the timer t2 and then changes its state from the waiting state to execution of processing for the event.

After a lapse of the minute display time, i.e., t2 seconds, control goes from step S108 to step S109 to execute processing to change the CPU from the intermediate wait state to the wait state. At this point of time, the update of the minute display is stopped.

Description has been given mainly of the change in the CPU state. However, the state of the CPU is not restricted by the sequence of processing shown in FIG. 1. Various configurations are available. For example, by setting the t2 seconds to infinity, the minute display clock is kept displayed. Description has been also given of an example of the state of the CPU in steps S107 and S109 of FIG. 1. However, there may be naturally employed a configuration in which the portable terminal system including the CPU is in the wait state.

Figure 2:
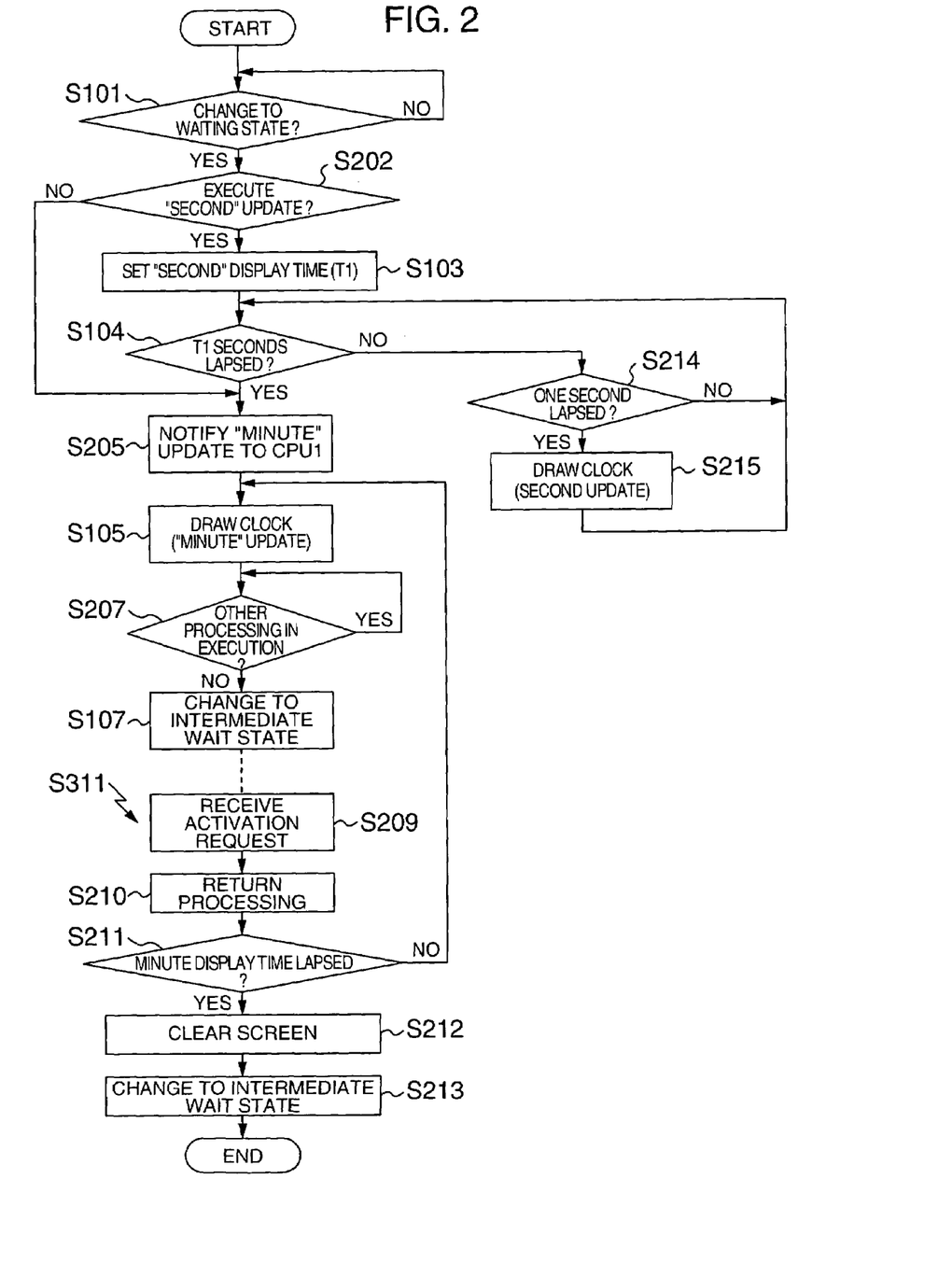
FIG. 2 is a flowchart showing a processing procedure of operation to control a CPU mainly for application according to the contents of a display screen in an embodiment of a portable terminal device according to the present invention.
Figure 3:
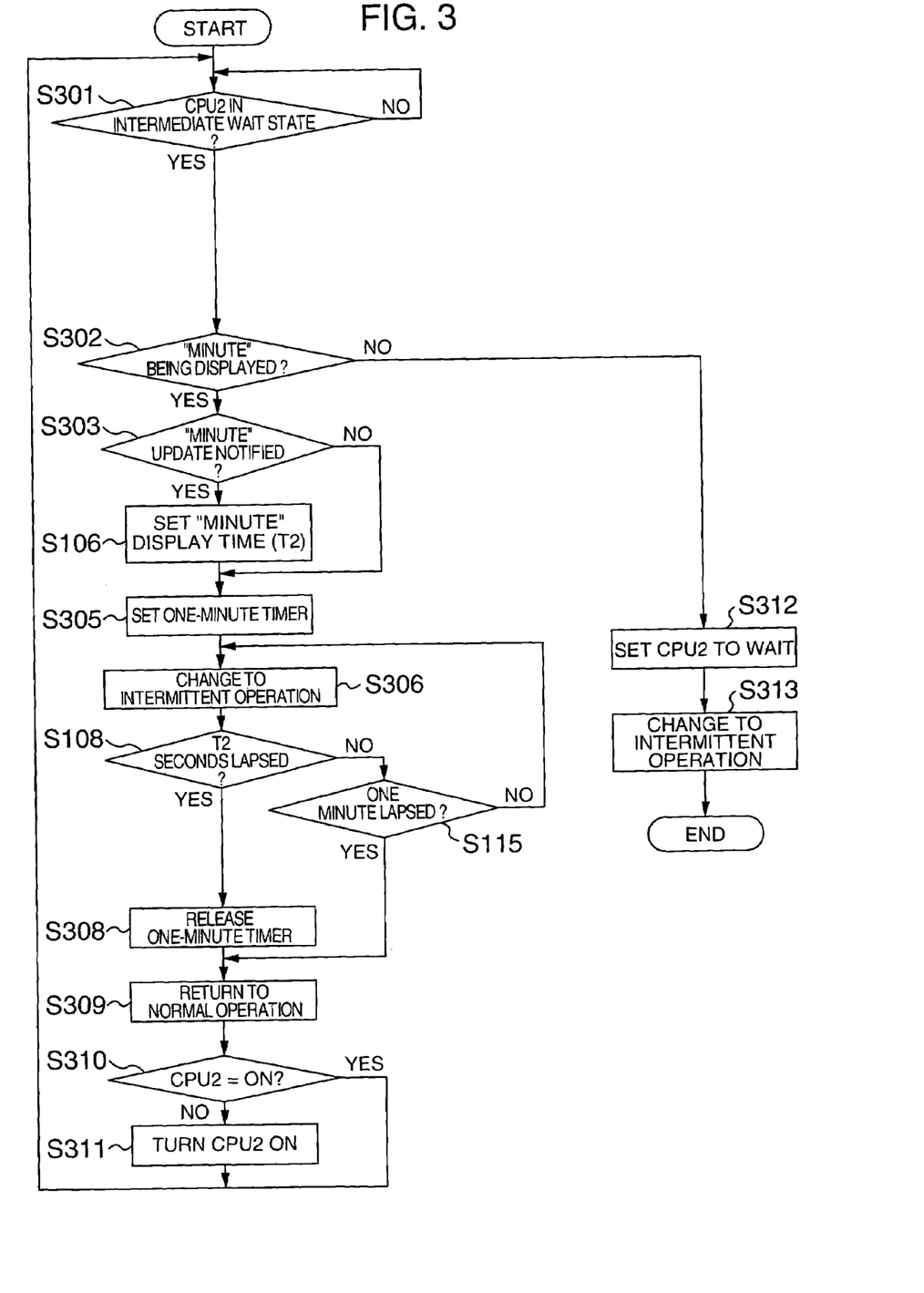
FIG. 3 is a flowchart showing a processing procedure of operation to control a CPU mainly for communication according to the contents of a display screen in an embodiment of a portable terminal device according to the present invention.

FIGS. 2 and 3 show the processing procedure shown in FIG. 1 for each processing of the CPU1 and CPU2. FIG. 2 shows the processing of the CPU2 and FIG. 3 shows that of the CPU1. In FIGS. 2 and 3, the same functional sections as those of FIG. 1 are assigned with the same reference numerals, and description thereof will be given only if such description is required.

In general, in a portable terminal device including one CPU, the CPU controls processing such as transmission and reception control, screen display, and timer control. For example, the CPU conducting the timer control executes processing such as activation thereof at a predetermined point of time to execute predetermined processing. On the other hand, in a portable terminal device including two CPU as shown in the embodiment, either one of the CPU can control the other one thereof. For example, the CPU1 can conduct a count operation for a timer to execute processing to activate the CPU2 at a predetermined point of time. In this case, the CPU2 needs not to control time at all.

Assume now in the embodiment that the CPU1 controls a transmission and reception section, conducts an intermittent operation, and controls the state of the CPU2, and the CPU2 conducts the screen display.

When the system enters the waiting state in FIG. 2, a check is made in step S202 to determine whether or not "seconds" are displayed. If the "second" display is not to be conducted, control goes to step S205 to execute "minute" update processing. On the other hand, when the "second" display is to be conducted, the CPU2 executes steps S214 and S215. That is, the CPU2 executes screen update for the "second" display at a one-second interval.

When a lapse of t1 seconds is detected in step S104, control goes to execution of the minute display. Step S205 is processing to notify the minute update to the CPU1. The notification is reflected in the judgement in step S303 shown in FIG. 3 and is used for the CPU1 side to recognize the start of the minute display.

After the minute clock is displayed in step S105, the CPU 2 changes in step S107 its state to the intermediate wait state. Step S207 is processing to determine whether or not the state can be immediately changed to the intermediate wait state. When any other processing is being executed, the CPU2 enters the intermediate wait state after the processing is terminated.

In this situation, the operation of the CPU2 is basically stopped in the intermediate wait state and the wait state, and the software is not operating in the embodiment. In this case, the CPU2 returns to an operating state when the CPU2 is activated by the CPU1 or through a return operation by an event of interruption.

Step S209 shows a state in which the CPU2 is activated by step S311 of the CPU1. Processing is discontinuous between steps S107 and S209. When the CPU2 is returned from the intermediate wait state to the operating state by the CPU1, the CPU2 executes appropriate return processing in step S210. Step 211 is processing to confirm a lapse of the time of t2 seconds to display "minute clock". If t2 seconds have not been lapsed, control returns to step S105 to update the clock (minutes) and the state is changed again to the intermediate wait state. When the display time of the minute clock finally lapses, control goes to step S212 to clear the display screen and then the system executes processing in step S213 to change the state to the intermediate wait state. FIG. 7C shows an example of the screen layout after the display is cleared. Although the screen of this kind is displayed when there exists nothing to be displayed, it is naturally possible to display a predetermined screen.

FIG. 3 shows a processing procedure of the CPU1 corresponding to the processing of the CPU2 shown in FIG. 2. The processing procedure of the CPU1 includes the waiting state, display of the second clock, display of the minute clock, and the screen update stop. The CPU1 detects in step S301 that the CPU2 enters the intermediate wait state. Various detection methods are possible, for example, a method to detect the condition according to a change in a state of a control pin and a method to detect the condition in response to information notified by software.

When it is recognized that the CPU2 is in the intermediate wait state, the CPU1 makes a check in step S302 to determine whether or not the minute clock is being displayed. If the clock is being displayed, the CPUL goes to step S303 to confirm presence or absence of notification of the minute update from the CPU2. The CPU2 notifies the minute update to CPU1 in step S205 of FIG. 2.

Having received the minute update notification, the CPU1 goes to step S106 to set the time t2 to display the minute clock. In this case, it is assumed that the CPUL sets t2 in step S106 only once immediately after the minute display is conducted.

Step S305 is timer setting to update the minute clock at a one-minute interval. In this case, the CPU1 conducts time control for the minute update and the CPU2 conducts the screen update. Having set the one-minute timer, the CPU1 starts an intermittent operation in step S306. Although not shown in FIG. 3, there may occur a case in which the CPU1 cannot start the intermittent operation. It is also possible in this situation that CPU1 starts an intermittent operation after the situation becomes suitable for the operation.

After a lapse of one minute, the CPU1 goes from step S115 to step S309 to change its operation from the intermittent operation to an normal operation. In step S311, the CPU1 turns the CPU2 on, that is, conducts the return from the intermediate wait state to the operating state. For the CPU2 of FIG. 2, step S209 is the return from the intermediate wait state.

After having activated the CPU2 in step S311, the CPU1 returns to step S301 to wait for an event in which the CPU2 enters again in the intermediate wait state. The processing is repeatedly executed while the minute clock is being displayed as above.

After a lapse of t2 seconds, when the "minute" clock display is finally finished, the CPU1 releases the one-minute timer in step S308 and then activates the CPU2 in step S311. On the other hand, the CPU2 goes from step S211 to S212 to clear the screen and then changes its state again to the intermediate wait state in step S213.

In response thereto, the CPU1 goes through steps S301 and S302 to step S312. Step S312 is processing to change the CPU2 from the intermediate wait state to the wait state. Thereafter, the CPUL enters a state in which the CPU1 activates the CPU2 only when required. The CPU1 then changes its state to the intermittent operation in step S313.

Figure 8:
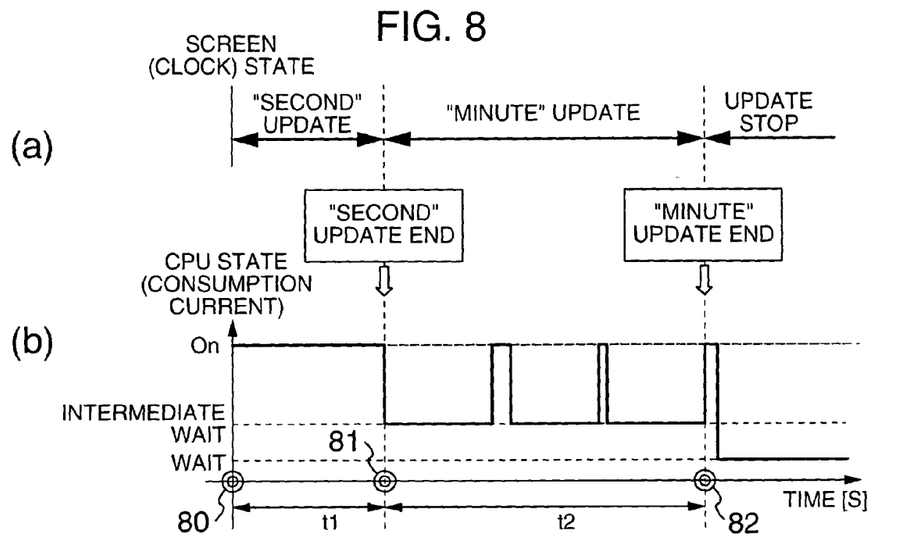
FIG. 8 is a graph showing a relationship between the contents of a display screen and a state of a CPU in an embodiment of a portable terminal device according to the present invention.

FIG. 8 shows a relationship between the screen (clock) display state and the state of the CPU2 in the embodiment of a portable terminal device. FIG. 8 corresponds to the processing procedures of the embodiment shown in FIGS. 1 to 3. FIG. 8(a) shows the screen (clock) display state and FIG. 8(b) shows the state of the CPU2 (change in a consumption current). It is assumed in FIG. 8 that a period of time required to change the display from the "second" display to the "minute" display is negligible.

In FIG. 8, a point 80 corresponds to step S101 in which the portable terminal device enters the waiting state. At a point 81 advanced by the "second" display time t1 of the clock relative to the point 80, the system executes processing of steps S104 to S107. That is, the screen display changes from the "second" display to the "minute" display, and the state of the CPU2 correspondingly changes from "on" to "intermediate wait". As a result, the consumption current of the CPU2 and the consumption current amount of the portable terminal device are reduced.

After a lapse of t2 seconds in the state of the "minute" display screen, the system executes processing of step S109 at a point 82. The CPU changes its state to the "wait" state. Description will be specifically given of the processing at the point 82 by referring to FIGS. 2 and 3. After the CPU2 once returns to "on" in step S209, the CPU2 changes its state again to the intermediate wait state in step S213. In response thereto, the CPU1 goes from step S301 to step S312 to change the CPU2 to the wait state. In the operation, there actually appears a transition period of time from the intermediate wait state to the wait state. However, the transition time is assumed to be negligible and hence is not taken into consideration in the description. There may be used a configuration in which, for example, in step S213, the state changes to the wait state without passing through the intermediate wait state.

During the count operation of t2 seconds in FIG. 8, the CPU2 turns on at a one-minute interval to execute processing to update "minutes" of the clock. The update processing at a one-minute interval corresponds to the processing routine ranging from step S105 to step S211.

As above, according to the screen display state, that is, the screen (clock) update frequency, the state of each CPU is controlled. Therefore, the consumption current amount of the portable terminal device can be reduced without deteriorating usability of the device for the user. Specifically, the CPU2 is kept in the on state during the "second" update period in which the processing is frequently executed. The CPU2 is changed to the intermediate wait state during the "minute" update period in which the processing is less frequently executed. During a period of time in which the screen update is not conducted after the "minute" update is finished, the CPU2 is changed to the wait state of the lower consumption current to execute processing in which supply of power is stopped or reduced to circuits and constituent components of the terminal device not requiring power in the state.

Figure 4:
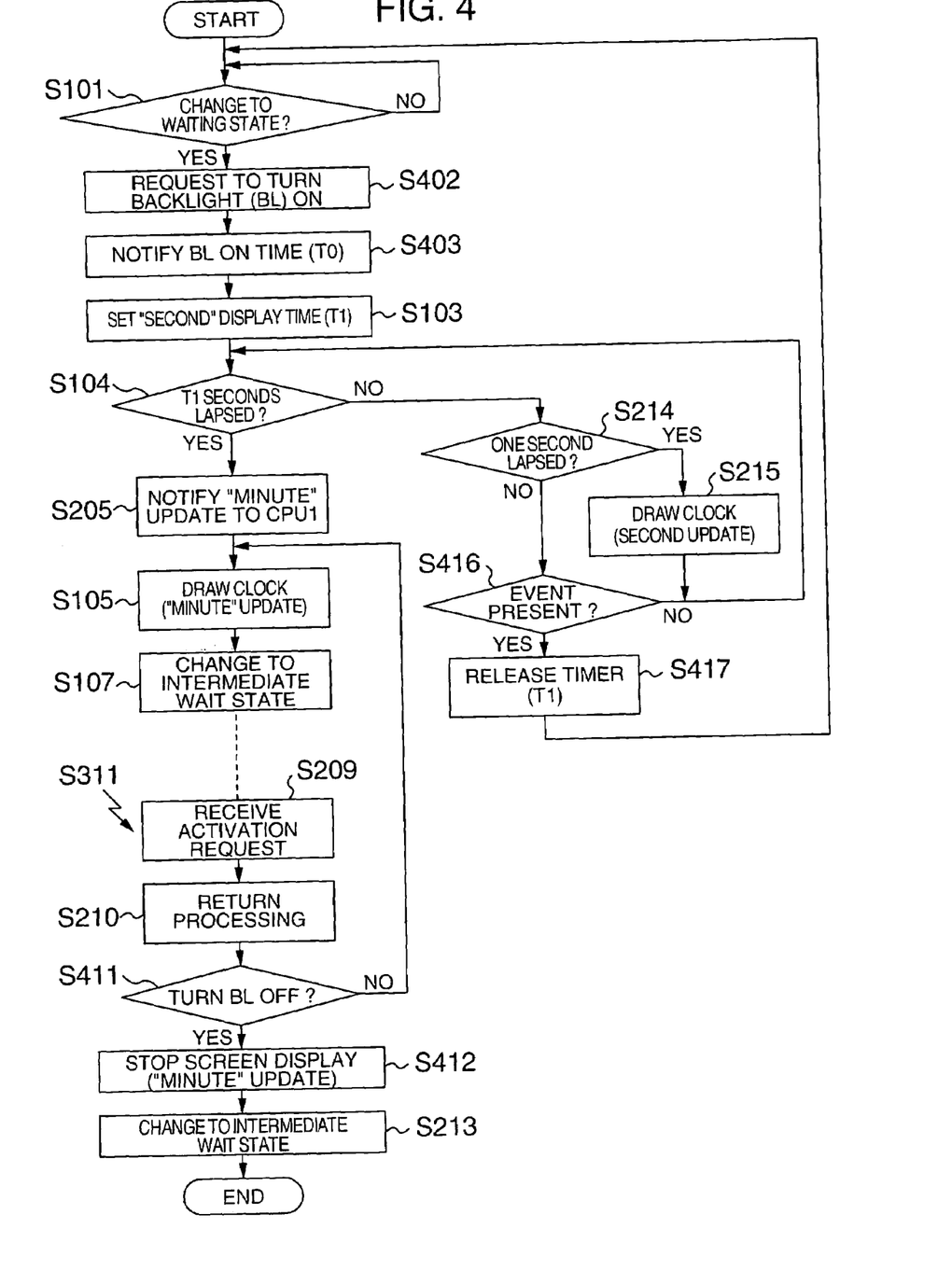
FIG. 4 is a flowchart showing a processing procedure of operation to control a CPU mainly for application according to the contents of a display screen and a state of backlight in an embodiment of a portable terminal device according to the present invention.
Figure 5:
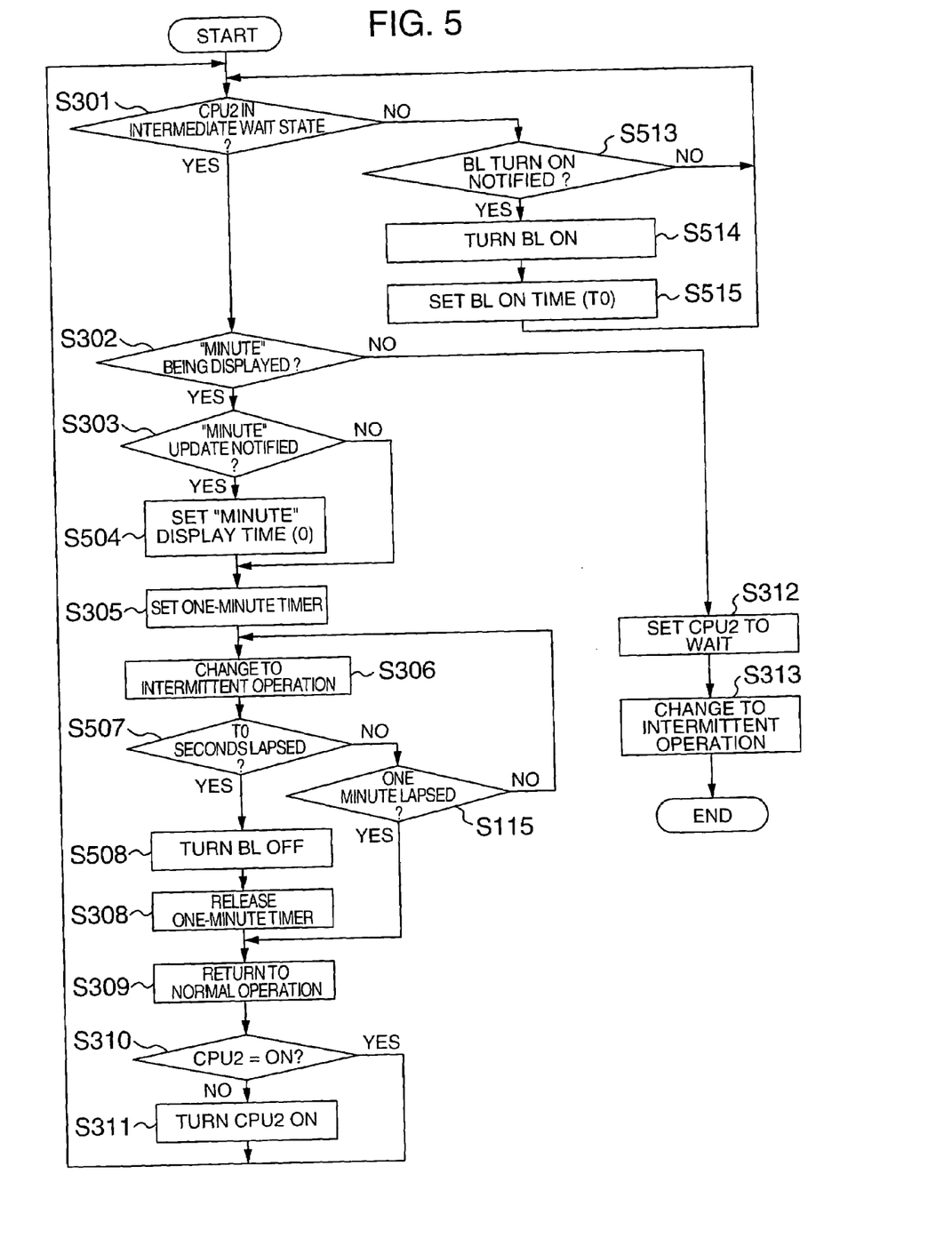
FIG. 5 is a flowchart showing a processing procedure of operation to control a CPU mainly for communication according to the contents of a display screen and a state of backlight in an embodiment of a portable terminal device according to the present invention.

FIGS. 4 and 5 show processing procedures of operation to control a CPU according to the display contents of a display screen and a state of backlight of the display screen the embodiment of a portable terminal device according to the present invention. FIG. 4 shows processing of the CPU2 and FIG. 5 shows processing of the CPU1.

The same constituent components as those of FIGS. 2 and 3 are assigned with the same reference numerals, and description thereof will be given if necessary. The processing of FIGS. 4 and 5 differs from that of FIGS. 2 and 3 in that processing to be executed according to a state (on/off) of backlight is added to that of FIGS. 4 and 5. Specifically, "backlight on time" is used in place of the "minute" clock display time such that when the backlight is turned off, the screen update is stopped and the CPU2 is transferred to the wait state. FIG. 4 does not include the judge processing shown in steps S202 and S207 of FIG. 2.

Having entered the waiting state in step S101 of FIG. 4, the CPU2 executes backlight processing in steps S402 and S403. Step S402 is a request to turn the backlight (BL) on and step S403 is notification of the backlight on time, i.e., t0 seconds. The processing and the notification are conducted for the CPU1.

After the display is changed from the "second" clock display to the "minute" clock display, the CPU2 waits for an event in which the backlight is turned off. After having confirmed that the backlight is turned off in step S411, the CPU2 goes to step S412 to stop the screen update and enters the intermediate wait state. That is, the "minute" clock update is stopped in response to the event that the backlight is turned off.

Steps S416 and S417 are processing in a case in which an event occurs when the "second" clock is being displayed. For example, at depression of a key, the CPU2 clears the "second" clock display and goes to execution of appropriate processing, for example, processing to draw a screen for the event occurred during the "second" clock display. FIG. 4 does not include processing for the CPU2 to leave the waiting state.

On the other hand, having received the notification of steps S402 and S403 from the CPU2, the CPU1 goes from step 513 to step S514. Steps S514 and S515 are processing to turn the backlight on and to set the on time, i.e., t0 seconds. In step 507, the CPU1 checks a lapse of the backlight on time t0 set in step S515. If to seconds have passed, the CPU1 turns the backlight off in step S508 and activates the CPU2 in step S311. Step S504 is processing to set the "minute" display time. In the example of FIG. 5, the "minute" display setting time is not required, and hence "0 second" is used as a setting value. That is, the "minute" clock display time is not set in FIG. 5.

The present embodiment is quite efficient for a portable terminal device using liquid crystal of total transmission type. The liquid crystal of this kind has an aspect that when the backlight is turned off, the contents of the screen display are almost invisible. Therefore, even when an update screen of, for example, a clock is displayed after the backlight is turned off, the user cannot obtain a clear image of the screen in many cases. In other words, usability of the terminal device is not deteriorated for the user even if the screen update is not conducted after the backlight is turned off. Naturally, it will not cause any problem even if a predetermined screen of an image of, for example, wallpaper is displayed after the backlight is turned off.

Figure 9:
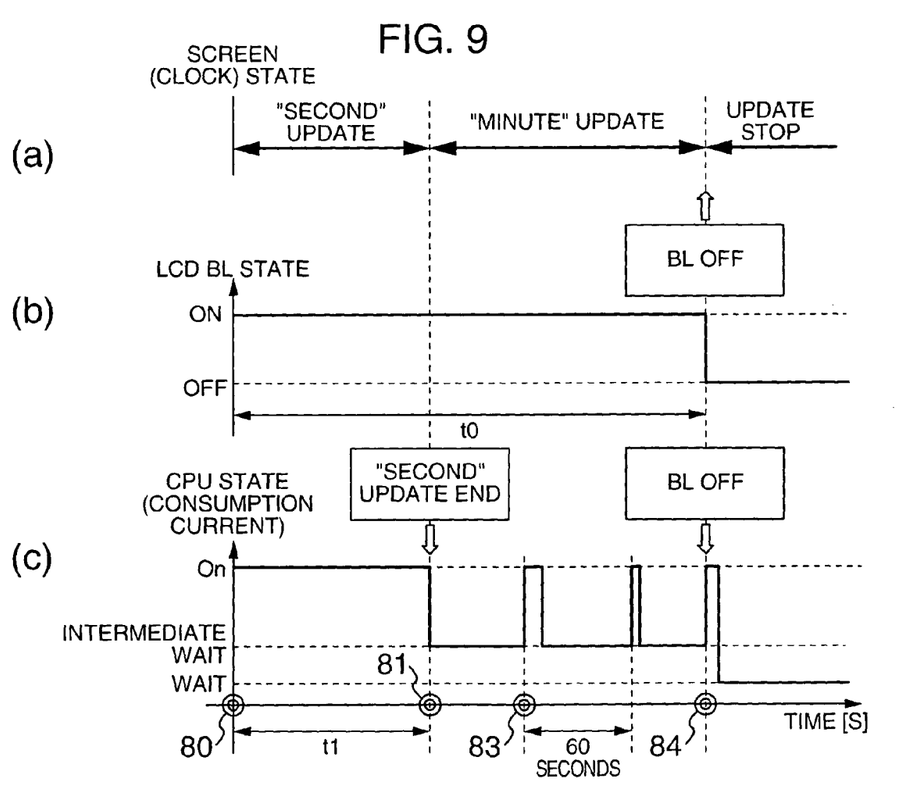
FIG. 9 is a graph showing a relationship between the contents of a display screen, a state of a CPU, and a state of backlight in an embodiment of a portable terminal device according to the present invention.

FIG. 9 shows a relationship between a screen (clock) display state, a state of the CPU2, and a state of the backlight in the embodiment. FIG. 9 corresponds to the processing procedures of the embodiment shown in FIGS. 4 and 5. FIG. 9(a) shows a state of the screen (clock) display, FIG. 9(b) shows a state of the backlight of the display screen (LCD), and FIG. 9(c) shows a state of the CPU2 (change in the consumption current). The same constituent components as those of FIG. 8 are assigned with the same reference numerals, and description thereof will be given only if necessary.

In FIG. 9, a period of time from a point 80 to a point 81 is a display update time t1 of the "second" clock. A period of time from the point 81 to a point 84 is a display update time t1 of the "minute" clock. FIG. 9 differs from FIG. 8 in that the point 84 is determined by the backlight on time, i.e. t0 seconds. A point 83 indicates "minute" clock update timing at which the CPU2 once enters the on state to update the screen.

As above, by controlling the state of each CPU in consideration of not only the screen display state but also the backlight state, display processing not essential for the system can be removed. Therefore, the consumption current amount is reduced. When the backlight is turned off, the "minute" update is stopped. Therefore, it is not required to set and to count the "minute" clock display time. This accordingly improves usability of the terminal device.

Figure 6:
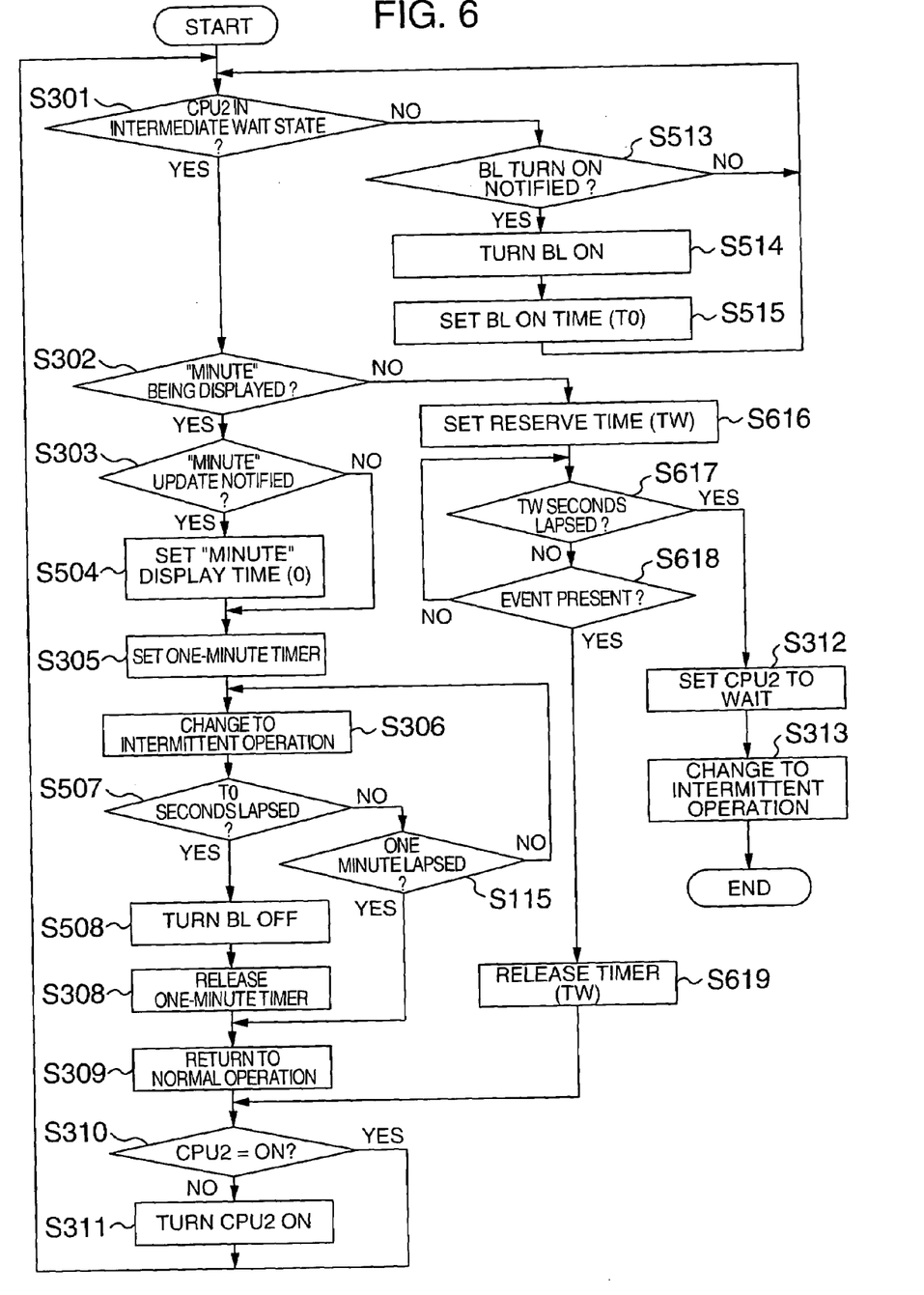
FIG. 6 is a flowchart showing a second processing procedure of operation to control a CPU mainly for communication according to the contents of a display screen and a state of backlight in an embodiment of a portable terminal device according to the present invention.

FIG. 6 shows a second processing procedure of operation to control a CPU according to the display contents of a display screen and a state of backlight of the display screen in the embodiment of a portable terminal device according to the present invention. FIG. 6 shows processing of the CPU1. In FIG. 6, the same functional sections as those of FIGS. 3 and 5 are assigned with the same reference numerals, and description thereof will be given only if necessary. The processing of FIG. 6 differs from that of FIG. 5 in that a delay time is disposed when the CPU2 is changed from the intermediate wait state to the wait state.

Steps S616 and S617 and step S312 correspond to the processing.

When the CPU1 turns the backlight off, the CPU2 stops the "minute" clock update and changes its state to the intermediate wait state. In this situation, the CPU1 goes from step S302 to step S616 of FIG. 6 to set a reserve time of tw seconds.

The reserve time tw is a wait time to wait for a point of time when the CPU2 is changed to the wait state. After a lapse of tw seconds, the CPU1 executes processing of step S312. In other words, for a period of tw seconds, the CPV2 stays in the intermediate wait state.

Figure 10:
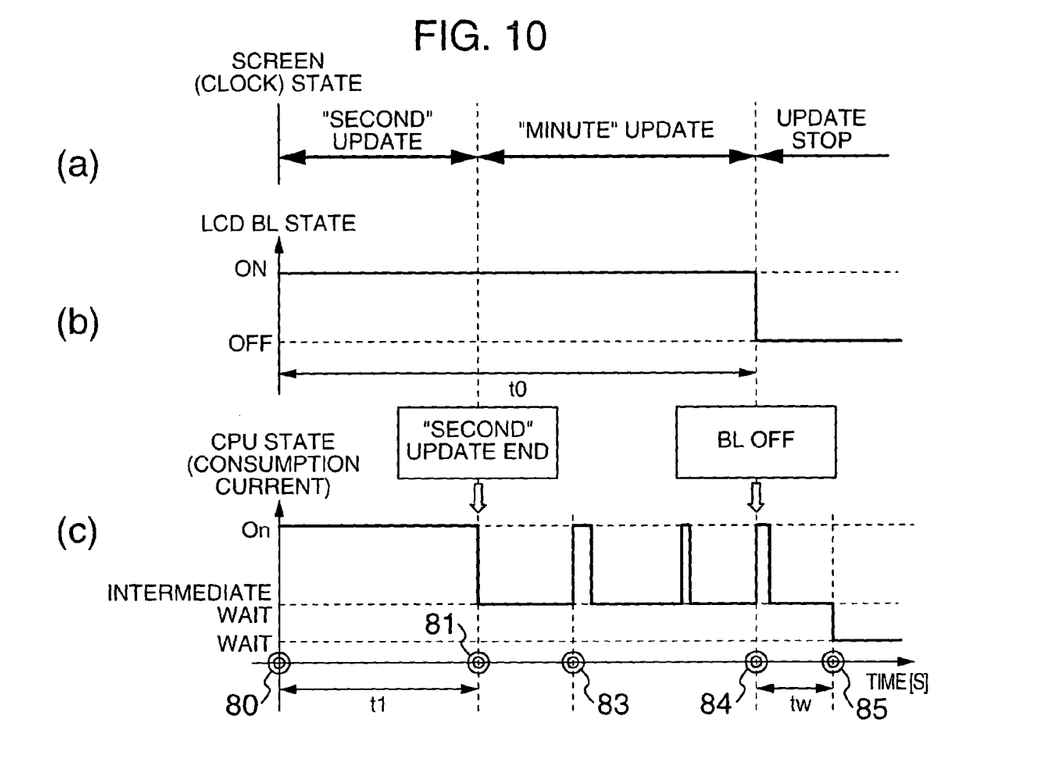
FIG. 10 is a second graph showing a relationship between the contents of a display screen, a state of a CPU, and a state of backlight in an embodiment of a portable terminal device according to the present invention.

FIG. 10 shows a relationship between the screen (clock) display state, the state of the CPU2, and the state of backlight when the processing of FIG. 6 is executed in the embodiment. FIG. 10(a) shows the screen (clock) display state, FIG. 10(b) shows the state of the backlight (BL) of the display screen (LCD), and FIG. 10(c) shows the state of the CPU2 (change in the consumption current). In FIG. 10, the same functional sections as those of FIGS. 8 and 9 are assigned with the same reference numerals, and description thereof will be given only if necessary.

When the backlight turns off at a point 84, the CPU2 once changes its state from the intermediate wait state to the on state and then returns again to the intermediate wait state. In this operation, the intermediate wait state is retained until the reserve time tw lapses. After a lapse of tw seconds, the CPU2 changes its state to the wait state at a point 85.

The reserve time tw is set when the state is changed from the intermediate wait state to the wait state in the embodiment of FIGS. 6 and 10. However, it is also possible that the on state is kept retained for, for example, tw seconds and then the state is changed to the intermediate wait state. The system may be configured such that after the "second" display is finished, a delay time is disposed near the point 81 for the CPU2 to change from the on state to the intermediate wait state. In these configurations, it is also possible that the CPU2 counts the delay time tw.

During the use of the portable terminal device, when the backlight turns off, the user may take reaction, for example, to input data using a key.

In the embodiment of FIG. 6 or FIG. 10, since a reserve time is disposed after the backlight turns off, when the user depresses a key immediately after the backlight turns off, the CPU2 returns to the operating state from the intermediate wait state, not from the wait state. Ordinarily, processing of the return from the intermediate wait state is easier and simpler than processing of the return from the wait state, and the return speed is higher in the former case. Therefore, by disposing the reserve time tw to keep the intermediate wait state for a predetermined period of time after the backlight turns off, there can be expected an advantage that the user feels less stress in the use of the portable terminal device. It is possible to prevent an unnecessary transition to the wait state after the backlight turns off.

Figure 11:
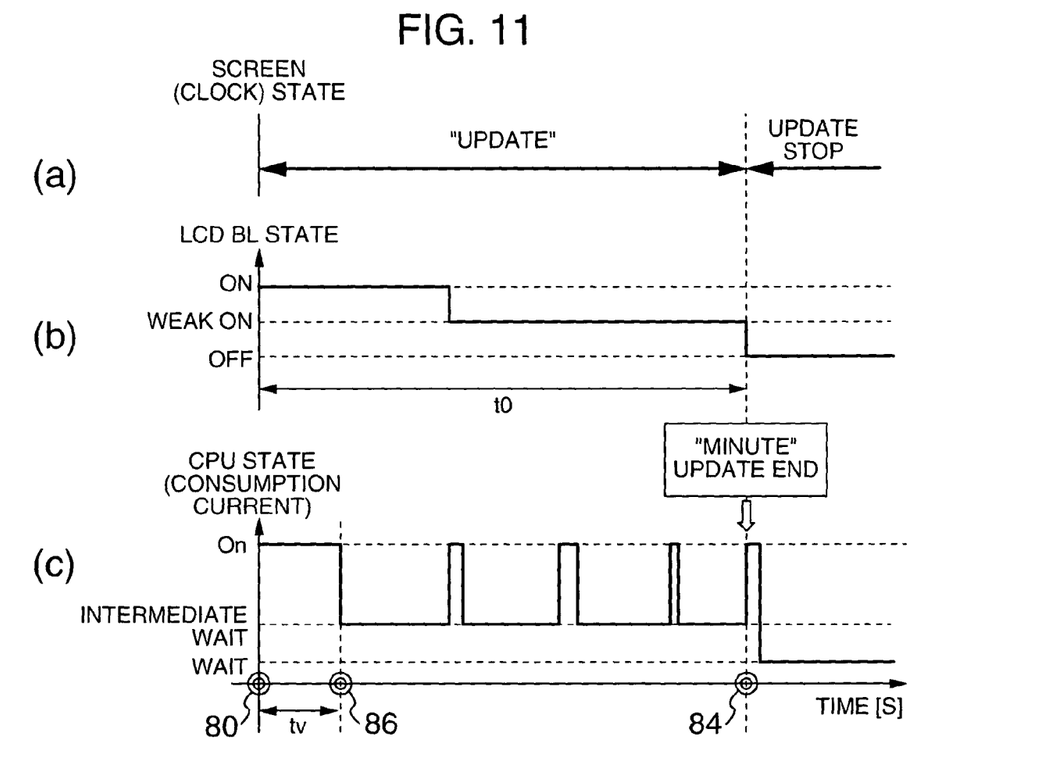
FIG. 11 is a third graph showing a relationship between the contents of a display screen, a state of a CPU, an a state of backlight in an embodiment of a portable terminal device according to the present invention.

FIG. 11 shows another relationship between the screen (clock) display state, the state of the CPU2, and the state of backlight when the processing of FIG. 6 is executed in the embodiment. FIG. 11(*a*) shows the screen (clock) display state, FIG. 11(*b*) shows the state of the backlight (BL) of the display screen (LCD), and FIG. 11(*c*) shows the state of the CPU2 (change in the consumption current). In FIG. 11, the same functional sections as those of FIGS. 8 to 10 are assigned with the same reference numerals, and description thereof will be given on if necessary.

FIG. 11 shows a screen layout example not conducting the "second" display. The backlight state can be changed in a plurality of levels. In an example shown in FIG. 11, the backlight state is changed in three levels, i.e., "on", "slightly on", and "off".

The consumption current of the portable terminal device can also be reduced by controlling the current supplied to the backlight. Therefore, when brightness of the backlight is lowered by reducing the supply current, the power consumption can be reduced depending on cases.

In FIG. 11, at a point 86 advanced by a particular time tv from a point 80 at which the CPU2 enters the waiting state, the CPU2 changes its state to the intermediate wait state. In this case, tv may be beforehand set or may be freely selected by the user.

However, when tv is elongated, the consumption current becomes correspondingly greater and hence the waiting time of the portable terminal device becomes shorter.

At a point 84 when the backlight is changed from the "slightly on" state to the off state, the CPU2 terminates the "minute" clock update and changes its state to the wait state.

In conjunction with the embodiments above, description has been given of control mainly of the state of each CPU. However, control is not limited to the CPU state but may also be conducted for the state of supply of power to the constituent components of the portable terminal device.

Description has been given of the case in which the "minute" clock display is stopped at transition from the intermediate wait state to the wait state in the embodiments. However, it is also possible that the "minute" clock display is continuously carried out and the state is returned from the wait state at an interval of one minute. There may also be used an embodiment in which the display contents are changed in response to the transition from the intermediate wait state to the wait state.

It is also possible that the CPU state is controlled according only to the on state of the backlight regardless of the display contents on the screen.

The embodiments regarding the backlight include one or two "on" levels. However, the present invention is not restricted by the embodiments. The on levels may be appropriately disposed according to the condition of each embodiment.

According to the condition of the embodiment, the control method of supplying power, namely, timing of the state transition may be changed. For example, when an absence report call or a mail item is received or when there exists information to be notified to the user of the portable terminal device together with, for example, schedule information linked with the information, it is also possible to use an embodiment in which the CPU stays in the intermediate wait state for a longer period of time.

In the embodiments described above, by controlling the states of a plurality of CPU according to the contents of the display screen and/or the state of the backlight of the portable terminal device, there is provided a portable terminal device in which unnecessary supply of power to constituent components of the terminal device can be reduced while keeping usability of the device for the user.

By disposing the state transition reserve time, the return processing can be simplified and can be executed at a high speed, and hence usability of the device is improved for the user.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A portable terminal device comprising:
   a communication central processing unit (CPU) for executing communication processing;
   an application CPU for executing application processing;
   a display for displaying an image according to a signal output from the communication CPU and/or application CPU; and
   a power supplier configured for increasing or for decreasing supply of power to the application CPU according to a periodical update interval of an image displayed on the display; wherein:
   the periodical update interval includes an update interval in seconds and an update interval in minutes;
   the power supplier decreases the supply of power to the application CPU when the update interval in seconds is changed to the update interval in minutes: and
   the power supplier decreases the supply of power to the application CPU when the update interval in minutes is set to a state in which a periodical update interval is stopped.

2. A portable terminal device according to claim 1, comprising:
- a communication central processing unit (CPU) for executing communication processing;
- an application CPU for executing application processing;
- a display for displaying an image according to a signal output from the communication CPU and/or application CPU; and
- a power supplier configured for increasing or for decreasing supply of power to the application CPU according to a periodical update interval of an image displayed on the display;
- wherein the power supplier decreases the supply of power to the application CPU after the update interval in minutes is set to a state in which a periodical update interval is stopped.

3. An information communication terminal device comprising:
- a communication device for communicating information;
- a display for displaying an image thereon;
- a plurality of CPUs for processing information; and
- a CPU state controller for controlling a state of each of the CPUs according to a periodical update interval of an image displayed on the display; wherein:
- the periodical update interval includes an update interval in seconds and an update interval in minutes;
- the CPU state controller controls, when the update interval in seconds is changed to the update interval in minutes, a state of one of the CPUs which executes processing of information regarding the image displayed on the display means; and
- the CPU state controller controls, when the update interval in minutes is set to a state in which a periodical update interval is stopped, a state of the CPU executing processing of information regarding the image displayed on the display.

4. An information communication terminal device according to claim 3
- wherein the CPU state controller delays timing of changing the state of the CPU.

5. An information communication terminal device comprising:
- a communication device for communicating information;
- a display for displaying an image thereon;
- a plurality of CPUs for processing information; and
- a CPU state controller for controlling a state of each of the CPUs according to a periodical update interval of an image displayed on the display; wherein:
- the periodical update interval includes an update interval in seconds and an update interval in minutes;
- the CPU state controller controls, when the update interval in seconds is changed to the update interval in minutes, a state of one of the CPUs which executes processing of information regarding the image displayed on the display means; and
- the CPU state controller delays timing of changing the state of the CPU.

6. An information communication terminal device according to claim 5,
- wherein when an incoming call is received by the information communication terminal device in a waiting state and a user of the terminal device does not respond to the incoming call, the CPU state controller delays timing of changing the state of the CPU.

7. An information communication terminal device comprising:
- a communication device for communicating information;
- a display for displaying an image thereon;
- a backlight for emitting light to the display;
- a plurality of CPUs for processing information; and
- a CPU state controller for controlling a state of each of the CPUs according to a periodical update interval of an image displayed on the display; wherein:
- the CPU state controller controls, when the backlight turns off, a state of a CPU executing processing of information regarding the image displayed on the display;
- the periodical update interval includes an update interval in seconds and an update interval in minutes;
- the CPU state controller controls, when the update interval in seconds is changed to the update interval in minutes, a state of one of the CPUs which executes processing of information regarding the image displayed on the display;
- the CPU state controller controls, when the update interval in minutes is set to a state in which a periodical update interval is stopped, a state of the CPU executing processing of information regarding the image displayed on the display; and
- the CPU state controller delays timing of changing the state of the CPU.

* * * * *